3,365,494
PRODUCTION OF N-ACYLATED-
UNSATURATED AMINES
Herbert L. Wehrmeister, Terre Haute, Ind., assignor to
Commercial Solvents Corporation
No Drawing. Filed Sept. 18, 1964, Ser. No. 397,632
8 Claims. (Cl. 260—558)

ABSTRACT OF THE DISCLOSURE

N-acyl-β-unsaturated amines are produced with a high conversion rate and in high yield by pyrolytic rearrangement of substituted oxazolines according to the equation:

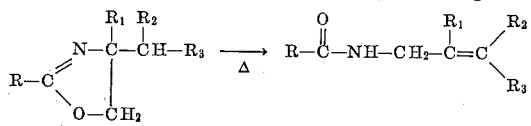

where R is alkyl, e.g. of about 1 to 25 carbon atoms, particularly lower alkyl, or phenyl, including substituted phenyls such as tolyl and chlorophenyl; $R_1$ is hydrogen or lower alkyl; and $R_2$ and $R_3$ are hydrogen or alkyl, particularly lower alkyl. The compounds are useful as intermediates. Alkaline hydrolysis will produce methallyl-amines.

---

The present invention relates to a process for the production of N-acyl-β-unsaturated amines, i.e. N-[2-alkylene]amides, and more particularly to a process for the production of such N[2-alkylene]amides by the pyrolytic rearrangement of substituted oxazolines.

It has now been surprisingly discovered, that N-acylated-β-unsaturated amines may be produced with a high conversion rate and in a high yield by pyrolytic rearrangement of substituted oxazolines. In general, this process is characterized by the equation:

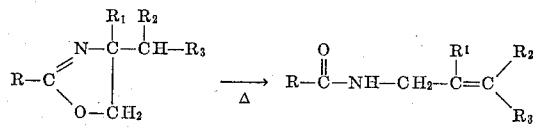

wherein R is alkyl, e.g. an alkyl having from about 1 to 25 or more carbon atoms, particularly a lower alkyl, or phenyl, including substituted phenyls the substituents of which do not interfere with the reaction such as toluyl and chlorophenyl; and $R_1$ is hydrogen or lower alkyl, e.g., methyl, ethyl, pentyl, etc.; and $R_2$ and $R_3$ are hydrogen or alkyl, particularly lower alkyl and comprises heating the oxazoline at a temperature and for a period of time sufficient to accomplish the rearrangement of the oxazoline.

The process of the present invention may, for example, be used to produce N-acylated-β-unsaturated amines by rearranging oxazolines such as: 2-ethyl-4,4-dimethyl-2-oxazoline to N-methallylpropionamide, 2-phenyl-4,4-dimethyl-2-oxazoline to N-methallylbenzamide, 2-phenyl-4-methyl-2-oxazoline to N-allylbenzamide, 2-(p-toluyl)-4-methyl-2-oxazoline to N-allyl-p-toluamide, 2,4-dimethyl-2-oxazoline to N-allylacetamide, 2-propyl-4,4-dimethyl-2-oxazoline to N-methallylbutyramide, 2-heptadecyl-4-methyl-2-oxazoline to N-allylstearamide, 2-pentyl-4-methyl-2-oxazoline to N-allyl-caproamide, 2-ethyl-4-pentyl-2-oxazoline to N-[2-heptenyl]propionamide, etc. Such N-allyl-amides, for example, may be used in the modification of textile polymers to improve dye acceptance.

A temperature of at least about 500° C., generally from about 500° to 600° C., and preferably above about 550° C., is advantageously used for rearrangement of the oxazoline. Higher temperatures, e.g. up to the decomposition temperature of the acylated-β-unsaturated amine may be used. Heating of the oxazoline may be accomplished by any conventional means such as, for example, by passing the oxazoline through a tube heated along its length or by heating the oxazoline in a flask attached to a vertical, heated tube and refluxing the vapors up into the tube. (Non-condensable gases can be exhausted to the atmosphere.) The acylated amine can be purified by distillation.

The process of the present invention can be carried out at atmospheric, superatmospheric or reduced pressure; e.g. a pressure of about 50 mm. can be used. The oxazoline is heated for a period sufficient for rearrangement of the oxazoline to the N-(2-alkylene)amide and, although the period varies depending upon the manner of heating, the particular temperature, pressure and oxazoline, generally the rearrangement occurs immediately upon achieving the reaction temperature. When heating in a flask, for example, a period of from about ½ to 30 hours, preferably 1 to 15 hours, is sufficient for the rearrangement of the oxazoline.

The following examples serve to further illustrate the present invention without, however, limiting the same.

Example I (A) 64 g. of 2-ethyl-4,4-dimethyl-2-oxazoline, B.P. 130° C., was dropped at a fairly even, manually controlled rate in 2 hours through a glass-bead filled, one inch diameter tube held in a vertical position and heated for 12 inches of its length by a tube furnace at a temperature of at least 360° C., maximum unknown. The product (63 g.) was distilled yielding 59.2 g. of material, B.P. 132° C. indicating essentially no reaction.

(B) Following the same procedure of Example I(A) but heating the tube at a temperature greater than 510° C., 53 g. of a mixture was obtained which on distillation yielded 27 g. of material, B.P. 94–138° C./20 mm. Redistillation of the mixture yielded 21.8 g. of N-methallylpropionamide, B.P. 128–136° C./20 mm. for a 34% yield of N-methallylpropionamide based on the oxazoline charged to the system. The reported B.P. of N-methallylpropionamide is 142° C./30 mm.

(C) Following the same procedure used in Examples I(A) and (B), additional experiments were carried out by passing several batches of 31.3 g. of 2-ethyl-4,4-dimethyl-2-oxazoline through the reactor in 35 minutes at different temperatures. The product mixtures were analyzed by gas chromatography and the results are summarized in Table I. Multiple temperature readings were taken in the reactor column. The maximum temperature occurred near the center of the 12 inch heated zone and was recorded as the reaction temperature in Table I.

TABLE I

| Batch | Reaction temperature (° C.) | Oxazoline conversion (percent) | Amide yield (percent) |
|---|---|---|---|
| (1) | 498 | 3 | |
| (2) | 590 | 62 | 63 |
| (3) | 588 | 70 | 67 |

Example II

Following the procedure of Example I, 344.7 g. of 2-ethyl-4,4-dimethyl-2-oxazoline (N. Eq. 130) was passed through the reactor tube in 6 hrs. 23 min. at a reaction temperature of 540° C. This reaction yielded 339 g. of material (N. Eq. 161). 334 g. of this material was again passed through the reactor in 6 hrs. 14 min. at 560° C. This latter reaction yielded 323 g. of material (N. Eq. 263). Upon distillation of the material, 146 g. of oxazoline and 135 g. of amide were recovered. The oxazoline conversion was 56% and the amide yield was 71%.

temperature occurred about 1 inch from the top of the heated zone.

TABLE II

| Batch | Reaction Temp. | Pot Temp. | Reaction Time | | Oxazoline Conversion | Amide yield by — | |
|---|---|---|---|---|---|---|---|
| | | | (Hrs.) | (Min.) | | Analysis (percent) | Isolation (percent) |
| (1) | 455 | 128–138 | 6 | 50 | Practically no reaction | | 85 |
| (2) | 513 | 133–137 | 7 | 10 | 6.6 | 88 | 85 |
| (3) | 565 | 133–180 | 6 | 46 | 78 | 91 | |

*Analysis.*—Calculated for N-methallylpropionamide, $C_7H_{13}NO$: N, 11.01; Iodine No. 199.6. Found: N, 11.20; Iodine No. 193.8, 193.7.

Example III 64 g. of 2-ethyl-4,4-dimethyl-2-oxazoline was charged to a flask attached to a vertical, one inch diameter, glass-bead filled tubbe heated for 12 inches of its length by a tube furnace. A thermocouple well extended through the center of the tube from the top to one inch from the bottom of the heated zone. The oxazoline was heated and the vapors refluxed up into the reactor tube at a pot temperature increasing from 134 to 190° C. in about 2 hrs. with the reactor tube at an unknown maximum temperature but greater than 345° C. Some material returned directly to the flask. Vapors passing through the tube were deflected to one side, condensed,. and returned to the flask by a side tube extending below the surface of the refluxing liquid. Dry $N_2$ was passed through the system throughout the run. The gases that passed out through the top of the condenser ($N_2$, etc.) were conducted through Dry Ice cooled traps. The reaction was continued until the reflux temperature of the flask contents reached the desired level. The product mixture was then distilled and the products suitably identified. Distillation of the mixture yielded 10 g. of unchanged oxazoline and 34.2 g. of N-methallylpropionamide. B.P. 120–136° C./20 mm. The oxazoline conversion was 84% and amide yield was 63%.

*Analysis.*—Found: N, 11.41.

A 6.5 g. portion of the product cut (B.P. 120–136° C./20 mm.) was hydrolyzed with aqueous alkali yielding 5 ml. of a distillate shown to be methyallylamine by conversion to a picrate, M.P. 202–205° C. The reported M.P. is 202.5–204.5° C. and 202–206° C.

Example IV (A) Following the procedure of Example III, 64 g. of 2-ethyl-4,4-dimethyl-2-oxazoline was refluxed at a pot temperature increasing from 135 to 217° C. in 5 hrs. 15 min. The maximum reactor temperature was again not determined. Distillation of the reaction mixture yielded 5 g. of unchanged oxazoline and 42.5 g. of amide, B.P. 130–135° C./20 mm. The oxazoline conversion was 92% and amide yield 72%.

*Analysis.*—Found: N, 11.44.

(B) Identification of the product of part A was made by hydrolysis of the product B.P. 130–135° C./20 mm., with aqueous NaOH which yielded methallylamine whose identity was established by preparation of the picrate, M.P. 204–206° C.; a phenylthiourea derivative, M.P. 76–77° C. (reported M.P. 78–79° C.) and by benzoylation to N-methallylbenzamide, M.P. 66–67° C. (reported 69.5–70.5° C.).

Example V

Several batches of 100 g. of 2-ethyl-4,4-dimethyl-2-oxazoline were reacted according to the procedure of Example III at different temperatures and the results are summarized in Table II. The temperature was measured at several positions in the heated zone. The maximum The products of Batches (2) and (3) were shown by gas chromatography to have purities of 95.9 and 96.8% respectively.

Example VI 2-ethyl-4,4-dimethyl-2-oxazoline was reacted according to the procedure of Example III at reduced pressure. Nitrogen was bled into the reaction mixture at a slow rate throughout the run. A 75% oxazoline conversion and 80% amide yield (B.P. 133.5–136° C./20 mm.) was obtained at a reaction temperature of 585 to 645° C. The pot temperature rose from 75 to 130° C. in 10 hrs. 30 min.

*Analysis.*—Found: N, 11.90; Iodine No. 204.4.

Example VII

Heating of 2-phenyl-4,4-dimethyl-2-oxazoline by the procedure of Example I at a maximum temperature of 493° C. resulted in an 8% conversion of oxazoline. Pyrolysis at 597° C. brought about extensive change. Distillation of the latter product resulted in a 21% yield of product, N-methallylbenzamide, B.P. 113–117° C./0.05 mm., the yield being based on the oxazoline charged.

Example VIII

Pyrolysis of 47 g. of 2-phenyl-4,4-dimethyl-2-oxazoline by the procedure of Example III but at reduced pressure (50 mm.) and with the pot temperature increasing from 152 to 187° C. in 6 hrs. (maximum reaction temperature unknown) gave 24 g. of product, B.P. 141–143° C./1 mm. M.P. 58–60° C., which was recrystallized for analysis from petroleum ether to a M.P. of 68–69° C. reported 69.5–70.5° C. The mixed M.P. with an authentic sample of N-methallylbenzamide (M.P. 66–67° C.) was 66–67° C.

*Analysis.*—Calculated for N - methallylbenzamide, $C_{11}H_{13}NO$: N, 8.00; Iodine No. 144.8; non-basic. Found: N, 7.15; Iodine No. 144, 146; non-basic.

Example IX

Following the procedure of Example VIII at a reaction temperature of 559° C. and with the pot temperature increasing from 152 to 159.5° C. in 26 hrs. 30 min. resulted in a 79% yield of amide at an oxazoline conversion of 28%. The product was collected at 136–142° C./1 mm. Gas chromatography indicated it to have a purity of 93.5%.

*Analysis.*—Found: N, 8.09; Iodine No. 143.

Example X

Following the procedure of Example I heating of 2,4-dimethyl-2-oxazoline at reactor temperatures of 402° C. and 495° C. resulted in very little change. A 14% oxazoline conversion occurred at 557° C. and a 46% conversion at 586° C.

The yield of isolated product, N-allylacetamide, B.P. 102–105° C./10 mm., in the latter conversion was 44%.

*Analysis.*—Calculated for N-allylacetamide, $C_5H_9NO$: N, 14.13; Iodine No. 256. Found: N, 14.80; Iodine No. 236. Infrared spectrum and an NMR spectrum are consistent for N-allylacetamide with a small amount of impurity.

*Examples XI to XVI*

The following rearrangements are conducted at temperatures above about 500° C.: 2-phenyl-4-methyl-2-oxazoline to N-allylbenzamide; 2-propyl-4,4-dimethyl-2-oxazoline to N-methallylbutyramide; 2-pentyl-4-methyl-2-oxazoline to N-allylcaproamide; 2-phenyl-4-pentyl-2-oxazoline to N-(2-heptenyl)benzamide; 2-ethyl-4-methyl-4-pentyl-2-oxazoline to N-(2-methyl-2-heptenyl)propionamide; 2-heptadecyl-4-methyl-2-oxazoline to N-allylstearamide.

It is claimed:
1. A process for the production of an N-(2-alkylene) amide having the formula:

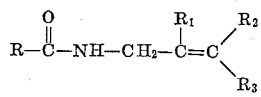

wherein R is selected from the group consisting of alkyl containing from about 1 to 25 carbon atoms and phenyl, $R_1$ is selected from the group consisting of hydrogen and lower alkyl; and $R_2$ and $R_3$ are individually selected from the group consisting of hydrogen and lower alkyl which comprises heating an oxazoline having the formula:

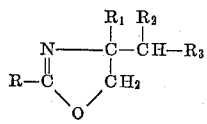

wherein R, $R_1$, $R_2$ and $R_3$ have the above designated meanings at a temperature of at least about 500° C. for a period of time sufficient to convert said oxazoline to said N-(2-alkylene)amide, said temperature being below the decomposition temperature of said N-(2-alkylene) amide.

2. The process of claim 1 wherein said temperature is about 550° C.

3. The process of claim 1 wherein said temperature is between about 500° and about 600° C.

4. The process of claim 1 wherein the process is carried out at atmospheric pressure.

5. The process of claim 1 wherein the process is carried out under reduced pressure.

6. The process of claim 1 wherein said oxazoline is 2-ethyl-4,4-dimethyl-2-oxazoline and said N-(2-alkylene) amide is N-methallylpropionamide.

7. The process of claim 1 wherein said oxazoline is 2-phenyl-4,4-dimethyl-2-oxazoline and said N-(2-alkylene) amide is N-methallylbenzamide.

8. The process of claim 1 wherein said oxazoline is 2,4-dimethyl-2-oxazoline and said N-(2-alkylene)amide is N-allylacetamide.

References Cited

Cornforth in: Elderfield Heterocyclic Compounds, vol. 5, pp. 386–8, New York, Wiley, 1957.

J. A. PATTEN, *Primary Examiner.*

W. A. MODANCE, *Examiner.*

N. TROUSOF, *Assistant Examiner.*